(12) United States Patent
Sala et al.

(10) Patent No.: US 8,063,792 B2
(45) Date of Patent: Nov. 22, 2011

(54) FIELD SERVICE AND METER READING DEVICES WITH GPS FUNCTIONALITY

(75) Inventors: John Sala, New Eagle, PA (US);
Jonathan Greisz, McKinney, TX (US);
Darren Sulfridge, Pleno, TX (US);
Steven Feeney, Merrimack, NH (US);
Wayne Young, Frisco, TX (US); Eric
Jason Nisewonder, Burlington, NC (US)

(73) Assignee: Neptune Technology Group, Inc.,
Tallassee, AL (US)

( * ) Notice: Subject to any disclaimer, the term of this patent is extended or adjusted under 35 U.S.C. 154(b) by 934 days.

(21) Appl. No.: 11/857,428

(22) Filed: Sep. 18, 2007

(65) Prior Publication Data

US 2008/0150751 A1    Jun. 26, 2008

Related U.S. Application Data

(60) Provisional application No. 60/826,049, filed on Sep. 18, 2006.

(51) Int. Cl.
*G08B 23/00* (2006.01)

(52) U.S. Cl. .............................. 340/870.02; 340/870.09

(58) Field of Classification Search ............. 340/426.19, 340/870.02, 870.09
See application file for complete search history.

(56) References Cited

U.S. PATENT DOCUMENTS

| | | | | |
|---|---|---|---|---|
| 7,175,104 | B2 * | 2/2007 | Allen, IV | 239/71 |
| 7,184,883 | B2 * | 2/2007 | Wischmeyer | 701/200 |
| 7,283,062 | B2 * | 10/2007 | Hoiness et al. | 340/870.02 |
| 7,362,239 | B2 * | 4/2008 | Franczyk et al. | 340/936 |
| 7,463,980 | B2 * | 12/2008 | Hoiness et al. | 701/213 |
| 7,583,202 | B2 * | 9/2009 | Robinson et al. | 340/870.02 |
| 2002/0152026 | A1 * | 10/2002 | Evans | 701/210 |
| 2003/0122686 | A1 * | 7/2003 | Ehrke et al. | 340/870.02 |
| 2005/0190074 | A1 * | 9/2005 | Cumeralto et al. | 340/870.02 |
| 2006/0085147 | A1 * | 4/2006 | Cornwall et al. | 702/62 |
| 2007/0247331 | A1 * | 10/2007 | Angelis et al. | 340/870.02 |
| 2008/0088475 | A1 * | 4/2008 | Martin | 340/870.02 |

\* cited by examiner

*Primary Examiner* — Timothy Edwards, Jr.
(74) *Attorney, Agent, or Firm* — David E. Mixon; Bradley Arant Boult Cummings LLP

(57) ABSTRACT

A utility meter reading device with a global positioning system (GPS) functionality has been developed. The device includes a utility meter reading unit that reads usage data from a utility meter and GPS unit. The GPS unit collects locating coordinates of the utility meter while the meter reading unit collects the usage data.

17 Claims, 4 Drawing Sheets

FIELD SERVICE AND METER READING DEVICES WITH GPS FUNCTIONALITY

CROSS-REFERENCE TO RELATED APPLICATIONS

This application claims the benefit of and priority from U.S. Provisional Patent Application Ser. No. 60/826,049 filed on Sep. 18, 2006, which is hereby incorporated by reference.

FIELD OF THE INVENTION

The invention relates generally to utility meters. More specifically, the present invention relates to a utility meter reading device with GPS functionality.

BACKGROUND ART

Meter reading systems for collecting data from utility meters that record the date and time of specific work performed by field workers are widely used. For example, meter reading devices carried by meter readers are capable of recording the date and time of meter reading, collections, and service order activity as utility company field workers travel from meter to meter collecting meter readings and completing orders for customers. However, efficient performance management of field workers is often difficult for utilities, and traveling from meter to meter, especially in residential areas, may present potential problems posed by obstacles or undesirable paths to field workers.

Utility companies face difficulties in efficiently managing the performance of field workers. While the meter reading device records the date and time of the specific work performed, falsifying meter readings, known as curbing or stumping, is a known practice among some field workers that is difficult for utility companies to oversee. It has also proved challenging for utility companies to regulate adherence among field workers to standard operating procedures.

Field workers may face several obstacles or routes that they may prefer to avoid as they travel, mostly by foot, through residential areas. Potential problems posed by such obstacles or undesirable paths are even greater if they are in an unfamiliar area. For example, a field worker may benefit from advanced notice of a potentially unruly pet, hostile resident or other obstacle or undesirable condition in close proximity to their location or along a potential route of travel to a meter. The possibilities of entering the wrong premises or entering data for the wrong customer due to mismatching of the meter being read to the account database are also problems that field workers and utility companies face. Consequently, a field device with GPS capabilities is needed.

SUMMARY OF THE INVENTION

In some aspects, the invention relates to a utility meter reading device with a global positioning system (GPS) capacity, comprising: a handheld mobile utility meter reading unit that is capable of reading utility meter usage data that is transmitted from a utility meter; a GPS unit that is integrated into utility meter reading unit, where the GPS unit automatically collects locating coordinates of the utility meter, provides navigation assistance to the user of the utility meter reading device in the form of heading, elevation, and speed, and also provides warnings to the user about hazards that may be encountered; and an electronic memory device that stores the locating coordinates and usage data collected by the utility meter reading device.

In other aspects, the invention relates to an apparatus for reading a utility meter, comprising: a utility meter reading unit that reads usage data from a utility meter; and a global positioning system (GPS) unit that collects locating coordinates of the utility meter while the meter reading unit collects the usage data.

In other aspects, the invention relates to an apparatus for reading a utility meter, comprising: means for reading utility meter usage data; and means for collecting location coordinates with a global positioning system (GPS) of the utility meter while the means for reading utility meter usage data collects the usage data.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
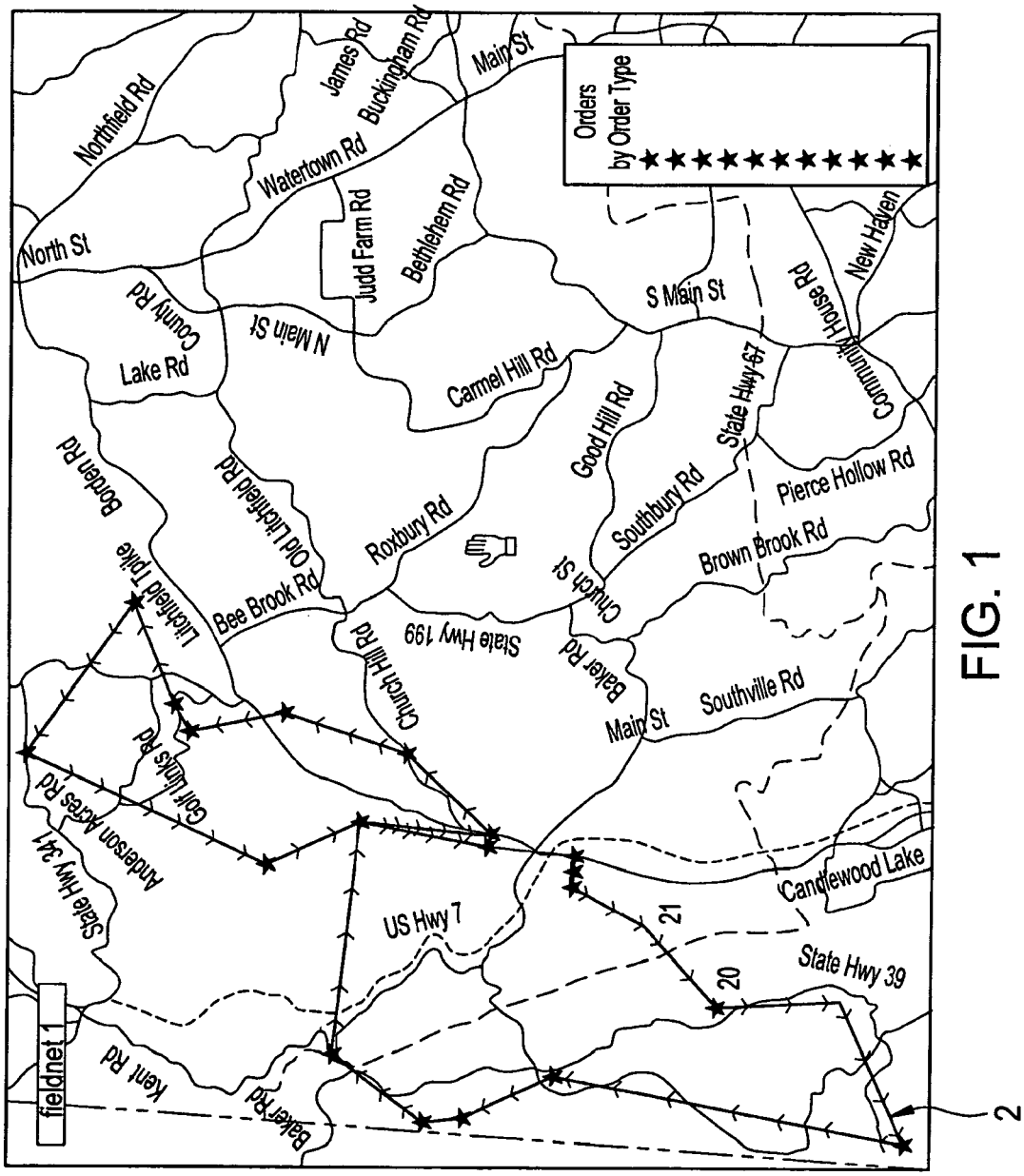
FIG. 1 shows an example of a screen print from a handheld meter reader of a map of a field worker's route.

Field service and meter reading devices with GPS capabilities for tracking and managing field workers and utility facilities is described in greater detail herein. Field service and meter reading devices may include devices such as handheld meter readers, mobile units, tablets and fixed network communication stations fixed at a location within a network. Global positioning systems (GPS) are commonly known and used. GPS is capable of, among other things, determining locations in position coordinates (longitude and latitude), referencing known coordinates and using directional proximity to determine locations, and recording and displaying locations on maps. GPS may also assist in navigating from one place to another.

By integrating GPS into the hardware and software of meter reading and field service devices, utility companies may be able to more efficiently manage the performance of field workers, improve safety or efficiency and provide legal benefits. GPS may be integrated into field service and meter reading devices when the devices are first manufactured. In an alternative embodiment, GPS may be retrofitted to meter reading devices as an attachment using a wired or wireless connectivity.

In an embodiment of the present invention, the GPS hardware may include a PC Card (such as PCMCIA, compact flash, SDIO, or like field replaceable medium), remote GPS antenna capability, and low power draw. The GPS hardware would be capable of operating at normal meter reading environmental conditions. More preferably, the OPS hardware would be capable of operating at a temperature between −4° F. to +120° F. and a humidity of 5% to 95%. The GPS hardware may be compatible with existing meter reading devices. For example, the GPS hardware may interface with handheld meter reading devices sold under the trademark DAP CE5320x handhelds by Neptune and tablets sold under the trademark CE8640 tablets by Neptune.

In an embodiment of the present invention, the GPS hardware would be capable of at least 12 satellite tracking locks and include wide area augmentation system (WAAS) support. It could also be capable of fast cold and hot starts. The heading, elevation, and relative speed could be captured by the GPS. Heading is defined as the direction in which a vehicle or person is moving. Elevation is defined as the distance above or below the mean sea level. The GPS hardware may be made compliant with the National Marine Electronics Association (NMEA) standards.

In an exemplary embodiment, the device would be capable of providing a minimum of 15 meter accuracy under average conditions. Average conditions are considered to be four satellites and no WAAS support. It would also be capable of running for at least eight hours on a single battery charge when it is used with all peripheral devices. In other embodiments, when used in conjunction with WWAN communication such as radio products sold by Neptune under trademarks HR2580/TR2580i and PCMCIA, the meter reading device with GPS functionality would be capable of running with limited vehicle based charging, five to seven minutes per hour. However, the performance of radio products should not be adversely affected.

In an embodiment of the present invention, the field service or meter reading device with GPS functionality would be capable of capturing longitude and latitude positions, providing a date and time stamp, and accuracy as correlated to a distance value or as a value indicating the number of satellite locks and WAAS.

In the embodiment of the present invention referred to in the Figures, the meter reading device with GPS functionality may display the following GPS characteristics on a meter reading device screen: the number of satellite locks 4, WAAS status 6, the current latitude 8 and longitude 10, the heading 14, speed 16 and elevation 12. In other embodiments, the present invention may be capable of displaying an "order completion" field to capture order completion without overwriting the account GPS location. It may allow utilities to set warnings, both audible and visible, when GPS is unavailable. Utilities may also set a warning, audible or visible, or allow automatic override capture of new GPS coordinates for a customer meter when new GPS coordinates that are captured during an order completion vary from current account coordinates by a distance set by the utility. On the other hand, the utility may be capable of programming an administrative setting to not capture GPS as the primary account coordinates when an account is read via radio frequency (RF) or conversely, to capture GPS coordinates for multiple points associated with a customer or account, such as asset location(s) and meter read locations. As discussed below, the present invention may also be capable of displaying the relative position and distance from a field worker's current location to another geo-located item and warning of obstacles, utility hazard codes or undesirable conditions within a field worker's proximity. In some applications, the present invention may be capable of logging GPS coordinates and transferring the data to other equipment for review and comparison to previously captured coordinates. The system may also be capable of providing programmatic refinement of asset locations utilizing multiple GPS coordinates obtained over time for that asset.

Utilities are interested in providing field workers with the most efficient routes for traveling between locations. FIG. 1 is a screen shot of a handheld meter reading device with GPS functionality screen displaying a map of a field worker's route 2 in accordance with one example of the present invention. Handheld meter reading devices with GPS functionality, as well as other field service and meter reading devices, have the capability to autonomously capture and display accurate customer meter and premise locations as well as utility facility locations. Utility companies may use locations that are captured and displayed by the field service and meter reading devices to increase and improve routing and rerouting capabilities and for facility management of transformers/poles, substations, and other equipment geo-locating needs. The information captured by the present invention may also be used to feed AM/FM, geographic information systems (GIS) and any other computerized mapping or tracking systems.

In an embodiment of the present invention, the GPS capabilities of the field service and meter reading devices may provide effective waypoints for use throughout the utility. For example, the field service and meter reading devices with GPS functionality may be capable of distinguishing between walking and driving portions of routes using speed capture capabilities of GPS. This feature may allow utilities to map actual field worker route paths 2, including both walking and driving portions, for training purposes. Using field service and meter reading devices with GPS functionality to capture and display utility field workers' actual movements may also improve utilities routing and rerouting efficiency. Personnel issues such as accurate reporting of activity time, adherence to regional work zones and safety issues such as speeding may also be monitored using captured waypoints.

Figure 2:
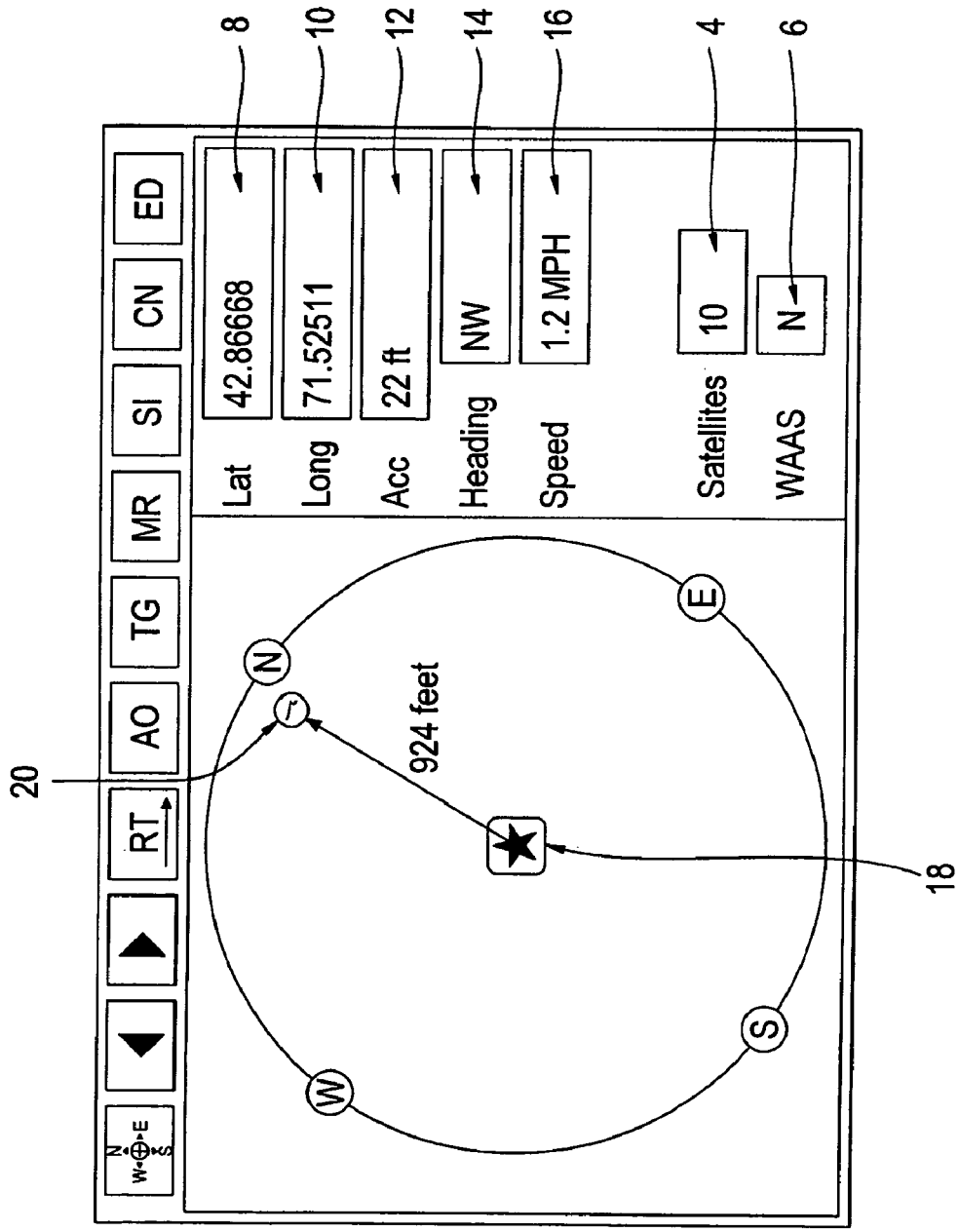
FIG. 2 shows an example of a screen print from a handheld meter reader displaying a field worker's current location and the location and proximity of another geo-located item.

In an embodiment of the present invention, field service and meter reading devices with GPS functionality may enable utilities to use GPS capabilities in the field to aid field worker navigation and safety. Field service and meter reading devices with GPS functionality may be capable of plotting absolute field worker position and associated geo-located items such as customer meters, obstacles, equipment and utility facilities. FIG. 2 is a screen shot of a handheld meter reading device with GPS functionality screen in accordance with one example of the present invention, displaying the direction and distance from a field worker's current location 18 to another geo-located item 20. Field service and meter reading devices with GPS functionality may provide direction to field workers when they are lost in the field, or simply provide the most direct route and distance to another location. By providing accurate directions, field workers may be more efficient in the field, cutting down on time and possibly costs associated with driving around looking for locations.

Figure 3:
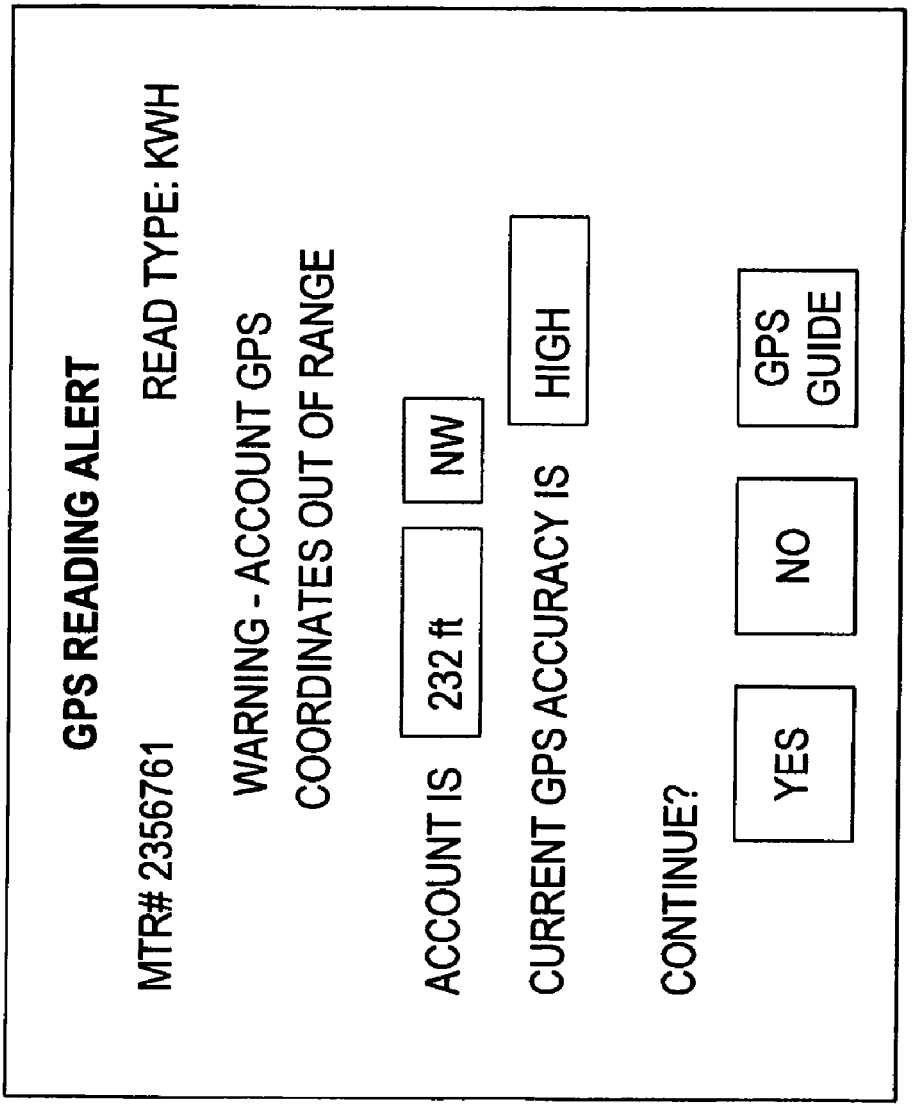
FIG. 3 shows an example of a screen print from a handheld meter reader identifying the customer meter and location.

In an embodiment of the present invention, the field service and meter reading devices with GPS functionality may have the ability to alert field workers of special conditions based on proximity to their location, such as working at the wrong premises, entering meter reading for the wrong customer, or identified hazards. FIG. 3 is a screen shot of a handheld meter reading device with GPS functionality screen in accordance with one example of the present invention, displaying a GPS alert that the coordinates for the specific account are out of range, thereby alerting a field worker that he is at the wrong location. By using GPS capabilities to accurately locate customer locations, field workers are better able to eliminate incorrect meter reads due to mistaken location. This feature provides an extra level of comfort and trust for utility customers in knowing that they are not being charged based on the wrong meter, as well as providing safety and confidence for field workers in knowing that they are in the correct location.

Figure 4:
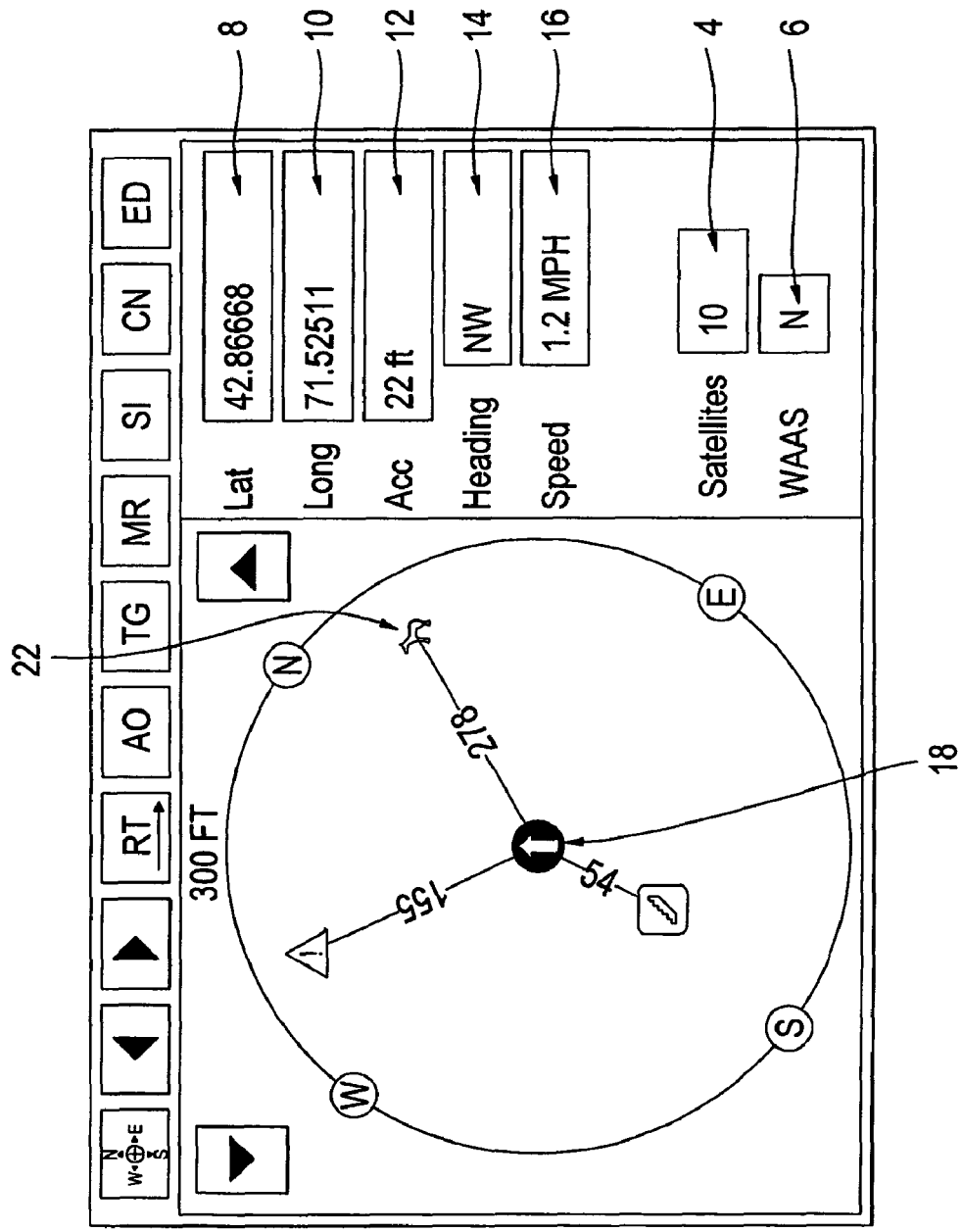
FIG. 4 shows an example of a screen print from a handheld meter reader displaying obstacles in the field worker's proximity.

FIG. 4 is a screen shot of a handheld meter reading device with GPS functionality screen displaying obstacles in the field worker's vicinity in accordance with one example of the present invention. Field workers may encounter several obstacles when they are in the field, especially in residential areas. For example, field workers may encounter unruly pets, hostile residents, and other undesirable conditions as they travel, often on foot, between customer meters. The field service and meter reading devices with GPS functionality may add an additional level of safety for field workers by providing the location of identified obstacles 22 in proximity to the field worker's location 18. The proximity distance in which field workers are alerted to obstacles may, if desired, be variable. Field workers may record obstacles they encounter into the meter reading system using GPS capabilities so that other field workers are alerted as they near the area. For example, if a field worker encounters an unruly pet, he may record the obstacle and set a warning for that location. As the next field worker nears the location, a warning of the unruly pet appears on the meter reading device screen. FIG. 3, for example, shows a picture of a dog in the location that it was encountered as well as the proximity of the obstacle 22 to the field worker 18.

In an embodiment of the present invention, the meter reading device with GPS functionality may allow utilities to create auditable records of field workers' locations using GPS capabilities. By using previously captured GPS coordinates from a field service or meter reading device with GPS functionality, the present invention may produce reports and alert office personnel of possible inaccurate meter reads. This feature may provide several benefits. First, meter read "curbing" or "stumping" may be eliminated. "Curbing" and "stumping" are terms of art in the utility business used to describe falsified meter readings due to field workers not properly reading customer meters. By recording field worker locations and routes, utilities will be able to identify field workers that are falsifying meter readings. Utilities may compare a field worker's route coordinates and the date/time stamp of GPS waypoints and order completion with the actual pre-collected route coordinates to determine whether a field worker is falsifying meter readings. Utilities may also use the speed capture capabilities of GPS to monitor employee performance and adherence to work rules. For example, when a field worker is using a mobile unit, the utility may monitor the speed of the vehicle to determine if the field worker is driving too fast for the meter reading device to collect accurate data from the meters or if the speed is considered unsafe. Creating auditable records may cut down on the high internal costs associated with curbing incidents as well as customer issues. Further, by recording field workers' locations, utilities may also monitor field workers' adherence to stated field worker standard operating procedures.

In other embodiments of the present invention, auditable records of field worker locations may also be useful to utilities in providing legal defenses. Records that accurately indicate precise location and time of field workers may help defend against potential allegations of wrongdoing by customers. Records of field worker location may also be useful in diversion investigations, actions against customers (customer threats) and criminal actions.

In an alternative embodiment of the present invention, it is contemplated that a third party conduit may be used in conjunction with meter reading devices to wirelessly transfer data to the utility home base as it is collected. The inventors anticipate employing cellular phones as such third party conduits. However, any device capable of connecting to the internet may be used. Current practice includes using laptop computers to transfer data from field devices to the utility home base. However, due to the size of a laptop, field workers will likely leave their laptops in their vehicles as they travel by foot between meter locations. This presents the risk of the laptop equipment being stolen, as well as the hassle of transferring data to be sent to the utility home base. Cellular phones, which are small enough to be easily carried by field workers, in conjunction with a mobile field service or meter reading device, may be capable of connecting to the internet in order to transfer data back to the utility home base. Information gathered by the meter reading devices may be wirelessly transferred to the cellular phone and transmitted to the utility. A meter reading device with GPS capabilities may allow the current location of a field worker to be transmitted to dispatchers, as well as the collected data, in order for the dispatchers to located field workers on a map. In addition to functioning as a third party conduit, the cellular phones could be used for emergency phone calls if needed.

In an embodiment of the present invention, the inventors contemplate connecting wirelessly to the cellular phone using standardized protocols, such as the current Bluetooth, or future substitute commercially standardized wireless connectivity. Using a standardized wireless connectivity is preferred because of the rapid upgrade of cellular phones. Integrating a cellular phone into the meter reading devices with GPS capabilities may require replacing the meter reading devices approximately every eighteen months as cellular phones improve. By using a cellular phone, or other device, as a third party conduit, and integrating only the standardized wireless connectivity necessary to communicate with the cellular phone, the cellular phone may be upgraded as necessary without requiring the expense of replacing the meter reading device. In an alternative embodiment of the invention, a cellular phone may be integrated into the meter reading devices rather than a standardized wireless connectivity.

In an alternative embodiment of the present invention, as an added safety feature, a third party conduit may be used to transfer an emergency notice when an emergency button is pressed on the field service or meter reading devices with GPS functionality. The utility home base could locate the field worker using GPS tracking, or if necessary, call them on a cellular phone, perhaps even the one used to transfer the emergency notice.

In an alternative embodiment of the present invention, it is contemplated that a mobile meter reading device may be placed in a vehicle to collect meter reads as the vehicle is driven. The mobile meter reading device may include a wireless communication card and may not require any user interaction. The meter reading device may be connected to the vehicle battery. When the vehicle ignition is switched off, the device may initiated wireless communications with the utility home base sending any meter reads collected. Once all collected meter reads have been sent, the meter reading device may clear its database of meter reads and turn off.

While examples of the present invention have been described primarily with respect to handheld meter readers, the present invention may also apply to mobile devices used for field service work and fixed network applications that communicate directly with meters from fixed locations within the network. For example, in an exemplary embodiment of the present invention, fixed network applications may use GPS capabilities to capture and record latitude and longitude positions of geo-located items. This application may be useful to utilities in tracking geo-located meters and other equipment, as well as gathering GPS coordinates for previously discussed applications.

In an embodiment of the present invention, the mobile meter reading device may be attached in a utility service feet. In various embodiments, it is contemplated that utilities may contract with service vehicles, such as mail trucks and package delivery trucks, to place mobile meter reading devices in the service vehicles to collect data along routes.

It should be clear from the description, that the present invention is amendable to embodiments with advantages over the prior art. Some of these advantages for the overall system may, if desired, include: autonomously capturing accurate customer meter and premise locations and utility facility locations for use throughout the utility; managing facilities such as transformer/poles, substations and other geo-located equipment; managing waypoint and other GPS information for use throughout the facility; capturing and displaying field workers actual movements to improve routing and rerouting efficiency; distinguishing between walking and driving portions of routes using speed capture capability of GPS; mapping of actual field worker route paths for knowledge transfer training purposes; using waypoints captured for personnel performance measurement, such as accurately reported time and adherence to work standards; using GPS enablement to aid field worker navigation and safety by providing absolute positions of field workers and associated geo-located items such as work locations, obstacles, equipment and utility facilities; alerting field workers of special conditions based on proximity, such as working at the wrong premise, entering meter readings for the wrong customer, or identified obstacles; and eliminating or reducing incidences of "curbing" and reduce high internal costs associated with curbing and customer issues.

Some advantages of using a cell phone as a third party conduit to transfer data may include: automatically transferring data to utility home base; using cell phone as third party conduit that are small enough for field workers to carry with them; eliminating or reducing the risks associated with leaving laptop computers and other equipment in vehicles; providing extra level of safety because the cell phone can also be used for emergency phone calls; and providing extra level of safety by transferring emergency notices to the utility home base.

Some advantages of the mobile meter reading device may, if desired, include: autonomously capturing meter reads without user intervention; automatically wirelessly transferring data to utility home base; and contracting public service carries to mount the black box mobile readers in their vehicle to collect data as they drive their routes.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A utility meter reading device with a global positioning system (GPS) capacity, comprising:
   a handheld mobile utility meter reading unit that is capable of reading utility meter usage data that is transmitted from a utility meter;
   a GPS unit that is integrated into utility meter reading unit, where the GPS unit automatically collects locating coordinates of the utility meter, provides navigation assistance to the user of the utility meter reading device in the form of heading, elevation, and speed, and also provides warnings to the user about hazards that may be encountered;
   where the reading unit provides a notice to the user that an incorrect meter has been read; and
   an electronic memory device that stores the locating coordinates and usage data collected by the utility meter reading device.

2. An apparatus for reading a utility meter, comprising:
   a utility meter reading unit that reads usage data from a utility meter; and
   a global positioning system (GPS) unit that collects locating coordinates of the utility meter while the meter reading unit collects the usage data;
   where the reading unit provides a warning to a user that an incorrect meter has been read.

3. The apparatus of claim 2, where the utility meter reading unit is fixed in a stationary location.

4. The apparatus of claim 2, where the GPS unit is retrofitted to the utility meter reading unit.

5. The apparatus of claim 2, where the GPS unit is integrated with the utility meter reading unit.

6. The apparatus of claim 2, where the GPS unit provides display maps to a user of the meter reading unit.

7. The apparatus of claim 2, where the GPS unit has a Wide Area Augmentation Support (WAAS) System.

8. The apparatus of claim 2, where the warning comprises a hazardous condition.

9. The apparatus of claim 2, where the GPS unit automatically collects location coordinates of the utility meter that is being read.

10. The apparatus of claim 2, where the apparatus stores the usage data, the location and the time of the utility meter reading.

11. The apparatus of claim 2, where the information collected by the UPS unit and the utility meter reading unit are transmitted back to a central collection unit via a cellular telephone.

12. The apparatus of claim 2, where the GPS unit provides navigation assistance to a user of the meter reading unit.

13. The apparatus of claim 12, where the navigation assistance comprises current location coordinates, directional heading, elevation, and speed.

14. The apparatus of claim 2, where the utility meter reading unit is mobile.

15. The apparatus of claim 14, where the mobile utility meter reading unit is a handheld unit.

16. The apparatus of claim 14, where the mobile utility meter reading unit is mounted in a vehicle.

17. An apparatus for reading a utility meter, comprising:
   means for reading utility meter usage data; and
   means for collecting location coordinates with a global positioning system (GPS) of the utility meter while the means for reading utility meter usage data collects the usage data;
   means for warning a user that an incorrect meter has been read.

* * * * *